(12) United States Patent
Yao et al.

(10) Patent No.: US 11,331,855 B2
(45) Date of Patent: May 17, 2022

(54) ADDITIVE MANUFACTURING WITH DITHERING SCAN PATH

(71) Applicant: Applied Materials, Inc., Santa Clara, CA (US)

(72) Inventors: Zhengping Yao, Cupertino, CA (US); Paul J. Steffas, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 667 days.

(21) Appl. No.: 16/189,740

(22) Filed: Nov. 13, 2018

(65) Prior Publication Data

US 2019/0143595 A1     May 16, 2019

Related U.S. Application Data

(60) Provisional application No. 62/585,463, filed on Nov. 13, 2017.

(51) Int. Cl.
| | |
|---|---|
| *B29C 64/268* | (2017.01) |
| *B29C 64/277* | (2017.01) |
| *B22F 3/00* | (2021.01) |
| *B33Y 10/00* | (2015.01) |
| *B33Y 30/00* | (2015.01) |
| *B22F 3/18* | (2006.01) |
| *B22F 12/00* | (2021.01) |
| *G02B 26/10* | (2006.01) |
| *G02B 26/12* | (2006.01) |
| *G02B 7/182* | (2021.01) |

(Continued)

(52) U.S. Cl.
CPC ............ *B29C 64/268* (2017.08); *B22F 3/005* (2013.01); *B22F 3/18* (2013.01); *B22F 12/00* (2021.01); *B29C 64/277* (2017.08); *B33Y 10/00* (2014.12); *B33Y 30/00* (2014.12); *G02B 7/1821* (2013.01); *G02B 26/101* (2013.01); *G02B 26/12* (2013.01); *G02B 26/122* (2013.01); *G02B 26/124* (2013.01); *G02B 26/126* (2013.01); *B22F 10/10* (2021.01); *B29C 64/153* (2017.08); *B33Y 40/00* (2014.12); *B33Y 70/00* (2014.12)

(58) Field of Classification Search
CPC ... B29C 64/268; B29C 64/277; G02B 26/124; G02B 7/1821; G02B 26/122; G02B 26/12
See application file for complete search history.

(56) References Cited

U.S. PATENT DOCUMENTS

| | | |
|---|---|---|
| 4,643,569 A | 2/1987 | Sullivan et al. |
| 6,359,255 B1 | 3/2002 | Yamamoto et al. |

(Continued)

FOREIGN PATENT DOCUMENTS

| | | |
|---|---|---|
| EP | 2926925 | 10/2015 |
| JP | 11-033752 A | 2/1999 |

(Continued)

*Primary Examiner* — Michael M. Robinson
(74) *Attorney, Agent, or Firm* — Fish & Richardson P.C.

(57) ABSTRACT

An additive manufacturing apparatus includes a platform, a dispenser configured to deliver a plurality of successive layers of feed material on a platform, a light source configured to generate a light beam, an auxiliary polygon mirror scanner configured to receive the light beam from the light source and reflect the light beam, and a primary mirror scanner to receive the light beam reflected by the auxiliary polygon mirror scanner and direct the light beam to impinge on an exposed layer of feed material.

18 Claims, 7 Drawing Sheets

(51) Int. Cl.
  *B33Y 70/00* (2020.01)
  *B33Y 40/00* (2020.01)
  *B29C 64/153* (2017.01)
  *B22F 10/10* (2021.01)

(56) References Cited

U.S. PATENT DOCUMENTS

| | | |
|---|---|---|
| 8,784,720 B2 | 7/2014 | Oberhofer et al. |
| 8,967,990 B2 | 3/2015 | Weidinger et al. |
| 9,073,260 B2 | 7/2015 | El-Siblani et al. |
| 9,073,261 B2 | 7/2015 | El-Siblani et al. |
| 9,073,262 B2 | 7/2015 | El-Siblani et al. |
| 9,079,355 B2 | 7/2015 | El-Siblani et al. |
| 9,415,443 B2 | 8/2016 | Ljungblad et al. |
| 2003/0052105 A1 | 3/2003 | Nagano et al. |
| 2006/0215246 A1 | 9/2006 | Kerekes et al. |
| 2009/0051935 A1* | 2/2009 | Cooper ............... G02B 26/101 356/616 |
| 2013/0001834 A1* | 1/2013 | El-Siblani ............ B29C 64/106 264/401 |
| 2014/0271328 A1 | 9/2014 | Burris et al. |
| 2015/0102531 A1 | 4/2015 | El-Siblani et al. |
| 2015/0283761 A1 | 10/2015 | Maeda et al. |
| 2016/0114432 A1 | 4/2016 | Ferrar et al. |
| 2017/0021454 A1* | 1/2017 | Dallarosa ............... B33Y 10/00 |
| 2017/0021455 A1 | 1/2017 | Dallarosa et al. |
| 2017/0036404 A1 | 2/2017 | Rengers et al. |
| 2017/0144254 A1 | 5/2017 | Buller et al. |
| 2017/0165751 A1 | 6/2017 | Buller et al. |
| 2017/0261743 A1* | 9/2017 | Kim ................... G05B 19/4099 |
| 2018/0257299 A1 | 9/2018 | Ng et al. |
| 2018/0257300 A1 | 9/2018 | Ng et al. |
| 2018/0257301 A1 | 9/2018 | Ng et al. |

FOREIGN PATENT DOCUMENTS

| | | |
|---|---|---|
| JP | 2009-006509 | 1/2009 |
| KR | 10-2003-0090042 | 11/2003 |
| KR | 10-2006-0012398 | 2/2006 |
| KR | 10-1612254 | 4/2016 |
| KR | 10-2016-0057568 | 5/2016 |
| KR | 10-2016-0109866 | 9/2016 |
| KR | 10-1682087 | 12/2016 |
| WO | WO 2009/026520 | 2/2009 |
| WO | WO 2016/026706 | 2/2016 |
| WO | WO 2016/051163 | 4/2016 |

* cited by examiner

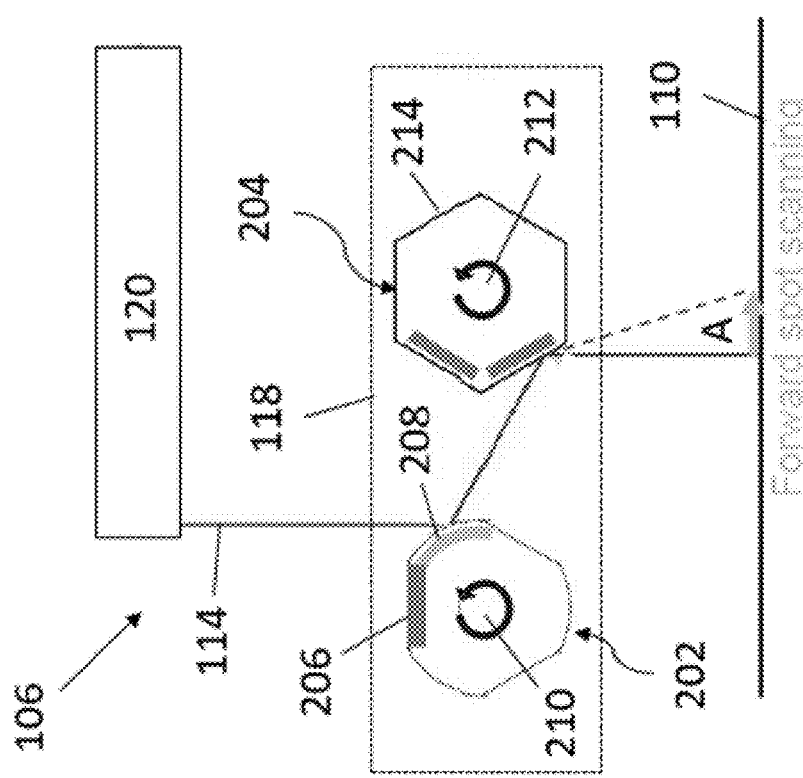

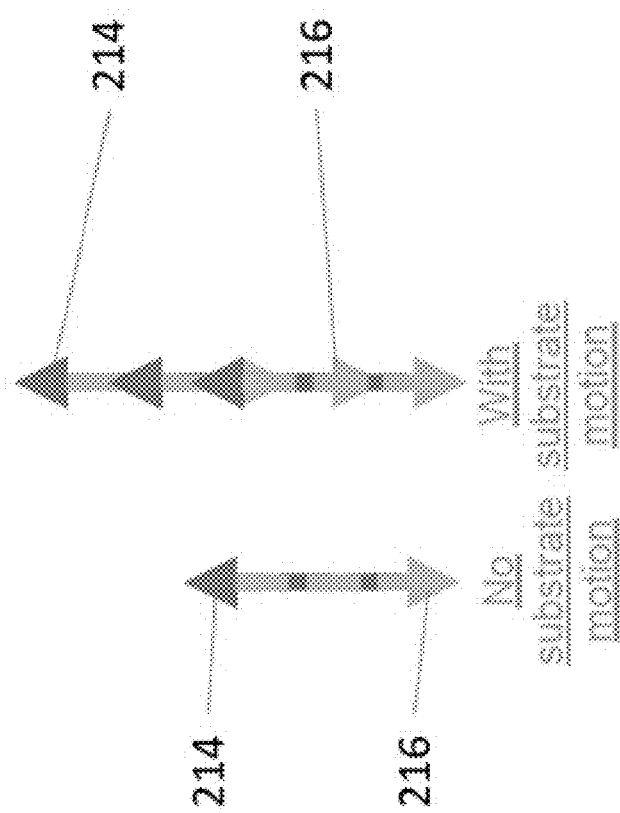

ADDITIVE MANUFACTURING WITH DITHERING SCAN PATH

CROSS-REFERENCE TO RELATED APPLICATIONS

This application claims priority to U.S. Provisional Application Ser. No. 62/585,463, filed on Nov. 13, 2017, the entire disclosure of which is incorporated by reference.

TECHNICAL FIELD

This disclosure relates to an energy delivery system for additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic, composite, or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern onto the powder to fuse the powder together to form a shape. Once the shape is formed, the platform is lowered and a new layer of powder is added. The process is repeated until a part is fully formed.

SUMMARY

This disclosure describes technologies relating to additive manufacturing.

In one aspect, an additive manufacturing apparatus includes a platform, a dispenser configured to deliver a plurality of successive layers of feed material on a platform, a light source configured to generate a light beam, an auxiliary polygon mirror scanner configured to receive the light beam from the light source and reflect the light beam, and a primary mirror scanner to receive the light beam reflected by the auxiliary polygon mirror scanner and direct the light beam to impinge on an exposed layer of feed material.

Implementations may include one or more of the following features.

The primary mirror scanner may be a polygon mirror scanner. The primary polygon mirror scanner and auxiliary polygon mirror scanner may rotate about parallel axes of rotation. The primary polygon mirror scanner may include a first rotational axis substantially parallel to the platform, and a second rotational axis substantially perpendicular to the platform.

The auxiliary polygon mirror scanner may include an even number of sides. The sides of the auxiliary polygon mirror scanner may include alternating sides with different curvatures. The alternating sides may include flat sides and curved sides. The curved sides may be convex.

A controller may be configured to cause the auxiliary polygon mirror scanner to rotate faster than the primary polygon mirror scanner during application of the light beam to a layer of feed material.

The primary mirror scanner may be a galvo mirror scanner configured to receive the light beam from the auxiliary polygon mirror scanner.

The primary mirror scanner may be configured to drive the light beam along a path across a surface of the feed material and the auxiliary polygon mirror maybe configured to dither the light beam as it travels along a scan path across the surface. The dither may be parallel and in-line with the scan path across the surface. The dither may be perpendicular to the scan path across the surface.

In another aspect, an additive manufacturing method includes producing a light beam with a light source, scanning the light beam along a scan path on a top layer of feed material on a platform, and dithering the light beam as it traverses the scan path across a surface of the feed material by reflecting the light beam off an auxiliary polygon mirror scanner.

Implementations may include one or more of the following features.

Dithering the light beam along the scan path may include oscillating a region of impingement of the light beam on layer of feed material parallel and in-line with the scan path. Dithering the light beam along the scan path may include oscillating a region of impingement of the light beam on layer of feed material perpendicular to the scan path.

The light beam may be directed towards a primary polygon mirror scanner with the auxiliary polygon mirror scanner. The light beam may be directed towards a galvo mirror scanner by the auxiliary polygon mirror scanner. The light beam may be directed towards the auxiliary polygon mirror scanner by a galvo mirror scanner.

In another aspect, an additive manufacturing system includes a platform, a dispenser configured to deliver a plurality of successive layers of feed material on a platform, a light source configured to generate a light beam, a controller, a primary polygon mirror scanner configured to direct the light beam to impinge on an exposed layer of feed material, and an auxiliary polygon mirror scanner configured to direct the light beam from the light source towards the primary polygon mirror scanner. The auxiliary mirror scanner is configured to dither the light beam along a scan path across the exposed layer of feed material.

Implementations may include one or more of the following features.

A galvo mirror scanner may be configured to direct the light beam towards the auxiliary polygon mirror. The auxiliary polygon mirror scanner may have an even number of sides. The even number of sides may include alternating flat sides and curved sides Particular implementations of the subject matter described in this disclosure can be implemented so as to realize one or more of the following advantages. The addition of a dither in-line with a scan path can reduce errors caused by bearing wobble in a polygon mirror scanner. The addition of a dither perpendicular to the scan path can increase the effective spot size of the impinging light beam.

The details of one or more implementations are set forth in the accompanying drawings and the description below. Other features, aspects, and advantages will become apparent from the description, the drawings, and the claims.

BRIEF DESCRIPTION OF THE DRAWINGS

FIGS. 2A-2B are schematic side-view diagrams of an example dithering mechanism.

FIG. 2C illustrates an example of a dithering scan path.

Like reference numbers and designations in the various drawings indicate like elements.

DETAILED DESCRIPTION

In many additive manufacturing processes, energy is selectively delivered to a layer of feed material dispensed by an additive manufacturing apparatus to fuse the feed material in a pattern, thereby forming a portion of an object. For example, a laser beam can be reflected off two galvo-driven mirrors whose positions are controlled to drive the laser beam in a vector-scan manner across the layer of feed material in which the laser beam traces a vector path in a continuous manner. Because the reflective members need to be accelerated and decelerated to control the location of the laser beam, the dwell time of the laser beam might not be uniform across the layer.

However, a reflective member, such as a polygon mirror scanner, that continuously rotates in one or more directions can be used in conjunction with modulation of the light beam to control where the energy is delivered. The continuous motion of the reflective member can reduce the number of delays required for scanning the light beam across the feed material, thus improving the throughput of objects formed by an additive manufacturing apparatus including the energy delivery system.

Furthermore, the object to be formed can have improved surface quality when energy delivered to the feed material is more consistently distributed. By delivering the light beam through components that move at constant velocities, e.g., constant rotational velocity, with minimal acceleration and deceleration, the energy delivery system can improve uniformity of the dwell time of the light beam. This can reduce the likelihood of inconsistent energy distribution.

Unfortunately, such rotating polygon mirror scanners can suffer from "bearing wobble" along their rotational axis. Such a wobble can lead to inaccuracies during the manufacturing process. In addition, adjusting the spot-size in light beam based manufacturing can be difficult.

An auxiliary polygon mirror scanner can be used to generate dithering (e.g., an oscillation) in the scan path of a light beam. The auxiliary polygon mirror scanner is placed in the light beam path and directs the light beam towards a primary mirror scanner. The auxiliary polygon mirror scanner can add a dither parallel or perpendicular to the scan path of the light beam. The dither can effectively widen the spot size of the light beam by scanning over the same path multiple times. The dithering can add additional heating control and can at least partially reduce the effects of bearing wobble.

Figure 1A:
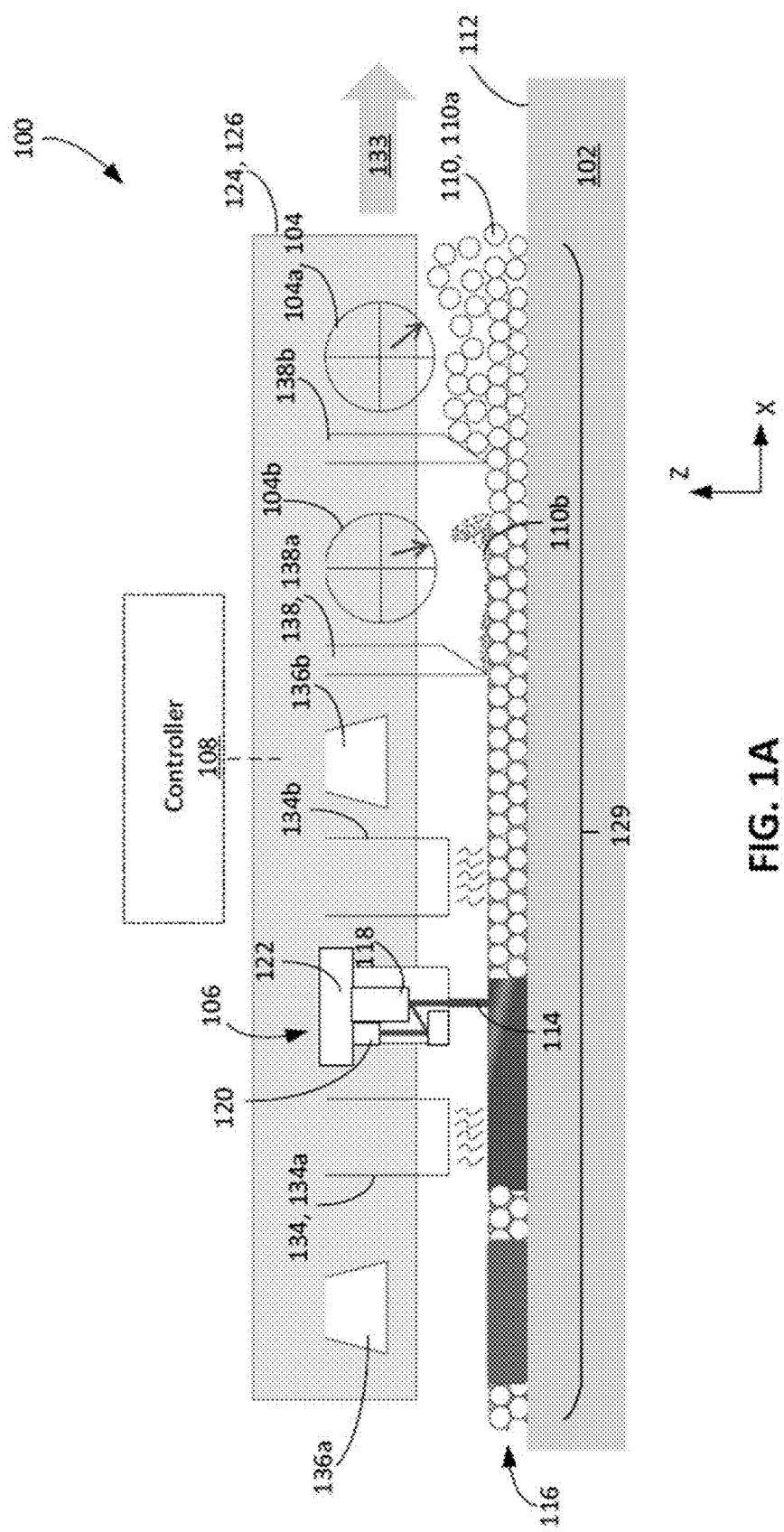
FIGS. 1A-1B are schematic side and top views of an example of an additive manufacturing apparatus.
Figure 1B:
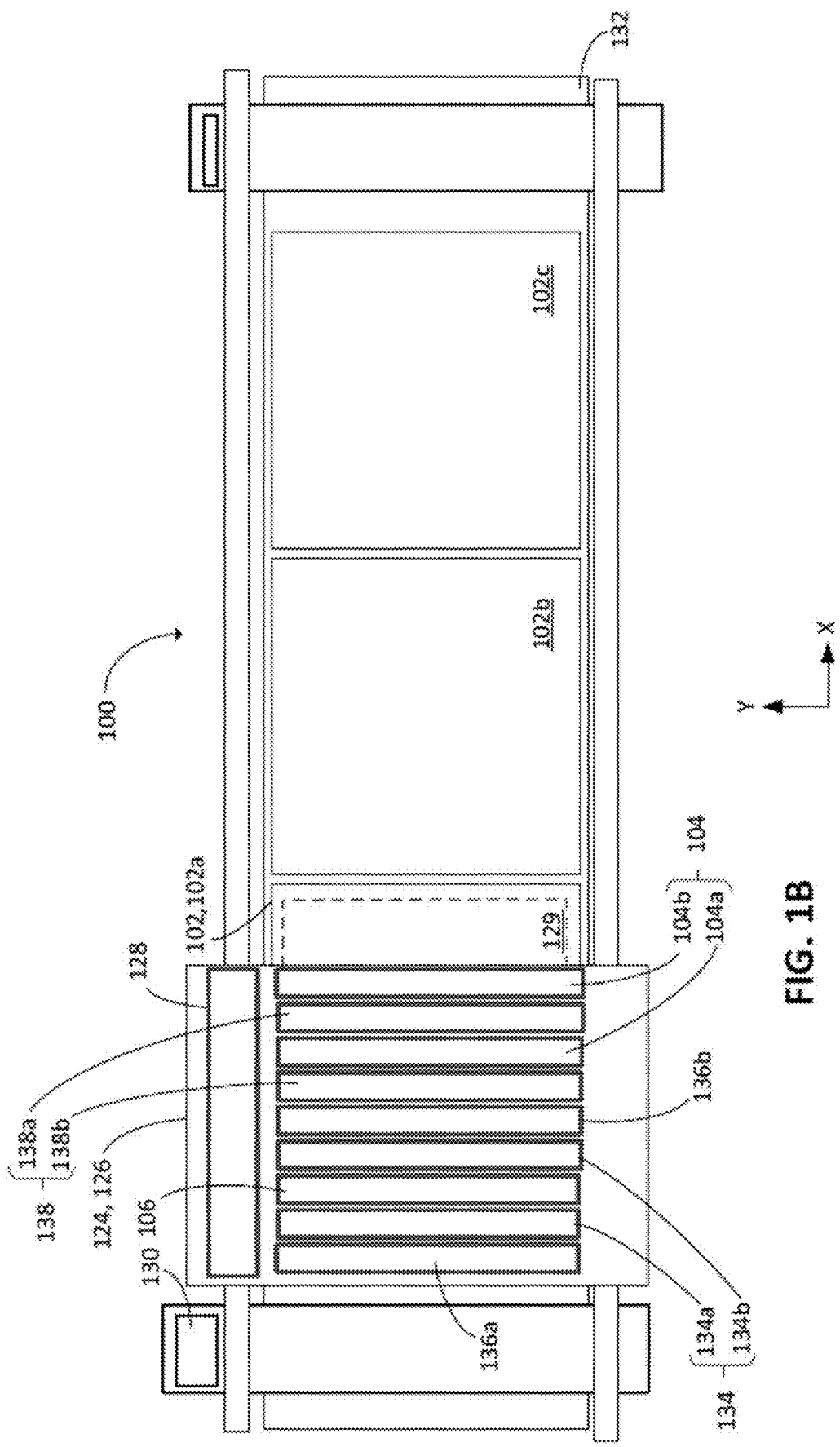

Referring to FIGS. 1A and 1B, an example of an additive manufacturing apparatus 100 includes a platform 102, a dispenser 104, an energy delivery system 106, and a controller 108. During an operation to form an object, the dispenser 104 dispenses successive layers of feed material 110 on a top surface 112 of the platform 102. The energy delivery system 106 emits a light beam 114 to deliver energy to an uppermost layer 116 of the layers of feed material 110, thereby causing the feed material 110 to be fused, for example, in a desired pattern to form the object. The controller 108 operates the dispenser 104 and the energy delivery system 106 to control dispensing of the feed material 110 and to control delivery of the energy to the layers of feed material 110. The successive delivery of feed material and fusing of feed material in each of the successively delivered layers result in formation of the object.

The dispenser 104 can be mounted on a support 124 such that the dispenser 104 moves with the support 124 and the other components, e.g., the energy delivery system 106, that are mounted on the support 124.

The dispenser 104 can include a flat blade or paddle to push a feed material from a feed material reservoir across the platform 102. In such an implementation, the feed material reservoir can also include a feed platform positioned adjacent the build platform 102. The feed platform can be elevated to raise some feed material above the level of the build platform 102, and the blade can push the feed material from the feed platform onto the build platform 102.

Alternatively or in addition, the dispenser can be suspended above the platform 192 and have one or more apertures or nozzles through which the powder flows. For example, the powder could flow under gravity, or be ejected, e.g., by piezoelectric actuator. Control of dispensing of individual apertures or nozzles could be provided by pneumatic valves, microelectromechanical systems (MEMS) valves, solenoid valves, and/or magnetic valves. Other systems that can be used to dispense powder include a roller having apertures, and an augur inside a tube having one or more apertures.

As shown in FIG. 1B, the dispenser 104 can extend, e.g., along the Y-axis, such that the feed material is dispensed along a line, e.g., along the Y-axis, that is perpendicular to the direction of motion of the support 124, e.g., perpendicular to the X-axis. Thus, as the support 124 advances, feed material can be delivered across the entire platform 102.

The feed material 110 can include metallic particles. Examples of metallic particles include metals, alloys and intermetallic alloys. Examples of materials for the metallic particles include aluminum, titanium, stainless steel, nickel, cobalt, chromium, vanadium, and various alloys or intermetallic alloys of these metals.

The feed material 110 can include ceramic particles. Examples of ceramic materials include metal oxide, such as ceria, alumina, silica, aluminum nitride, silicon nitride, silicon carbide, or a combination of these materials, such as an aluminum alloy powder.

The feed material can be dry powders or powders in liquid suspension, or a slurry suspension of a material. For example, for a dispenser that uses a piezoelectric printhead, the feed material would typically be particles in a liquid suspension. For example, a dispenser could deliver the powder in a carrier fluid, e.g. a high vapor pressure carrier, e.g., Isopropyl Alcohol (IPA), ethanol, or N-Methyl-2-pyrrolidone (NMP), to form the layers of powder material. The carrier fluid can evaporate prior to the sintering step for the layer. Alternatively, a dry dispensing mechanism, e.g., an array of nozzles assisted by ultrasonic agitation and pressurized inert gas, can be employed to dispense the first particles.

The energy delivery system 106 includes a light source 120 to emit a light beam 114. The energy delivery system 106 further includes a reflector assembly 118 that redirects the light beam 114 toward the uppermost layer 116. Example implementations of the energy delivery system 106 are described in greater detail later within this disclosure. The reflective member 118 is able to sweep the light beam 114 along a path, e.g., a linear path, on the uppermost layer 116. The linear path can be parallel to the line of feed material delivered by the dispenser, e.g., along the Y-axis. In conjunction with relative motion of the energy delivery system 106 and the platform 102, or deflection of the light beam 114 by another reflector, e.g., a galvo-driven mirror, a polygon scanner mirror, or any other directing mechanism, a sequence of sweeps along the path by the light beam 114 can create a raster scan of the light beam 114 across the uppermost layer 116.

As the light beam 114 sweeps along the path, the light beam 114 is modulated, e.g., by causing the light source 120 to turn the light beam 114 on and off, in order to deliver energy to selected regions of the layers of feed material 110 and fuse the material in the selected regions to form the object in accordance to a desired pattern.

In some implementations, the light source 120 includes a laser configured to emit the light beam 114 toward the reflector assembly 118. The reflector assembly 118 is positioned in a path of the light beam 114 emitted by the light source 120 such that a reflective surface of the reflector assembly 118 receives the light beam 114. The reflector assembly 118 then redirects the light beam 114 toward the top surface of the platform 102 to deliver energy to an uppermost layer 116 of the layers of feed material 110 to fuse the feed material 110. For example, the reflective surface of the reflector assembly 118 reflects the light beam 114 to redirect the light beam 114 toward the platform 102.

In some implementations, the energy delivery system 106 is mounted to a support 122 that supports the energy delivery system 106 above the platform 102. In some cases, the support 122 (and the energy delivery system 106 mounted on the support 122) is rotatable relative to the platform 102. In some implementations, the support 122 is mounted to another support 124 arranged above the platform 102. The support 124 can be a gantry supported on opposite ends (e.g., on both sides of the platform 102 as shown in FIG. 1B) or a cantilever assembly (e.g., supported on just one side of the platform 102). The support 124 holds the energy delivery system 106 and dispensing system 104 of the additive manufacturing apparatus 100 above the platform 102.

In some cases, the support 122 is rotatably mounted on the support 124. The reflector assembly 118 is rotated when the support 122 is rotated, e.g., relative to the support 124, thus reorienting the path of the light beam 114 on the uppermost layer 116. For example, the energy delivery system 106 can be rotatable about an axis extending vertically away from the platform 102, e.g., an axis parallel to the Z-axis, between the Z-axis and the X-axis, and/or between the Z-axis and the Y-axis. Such rotation can change the azimuthal direction of the path of the light beam 114 along the X-Y plane, i.e., across the uppermost layer 116 of feed material.

In some implementations, the support 124 is vertically movable, e.g., along the Z-axis, in order to control the distance between the energy delivery system 106 and dispensing system 104 and the platform 102. In particular, after dispensing of each layer, the support 124 can be vertically incremented by the thickness of the layer deposited, so as to maintain a consistent height from layer-to-layer. The apparatus 100 further can include an actuator 130 configured to drive the support 124 along the Z-axis, e.g., by raising and lowering horizontal support rails to which the support 124 is mounted.

Various components, e.g., the dispenser 104 and energy delivery system 106, can be combined in a modular unit, a printhead 126, that can be installed or removed as a unit from the support 124. In addition, in some implementations the support 124 can hold multiple identical printheads, e.g., in order to increase of the scan area to accommodate larger parts to be fabricated.

Each printhead 126 is arranged above the platform 102 and is repositionable along one or more horizontal directions relative to the platform 102. The various systems mounted to the printhead 126 can be modular systems whose horizontal position above the platform 102 is controlled by a horizontal position of the printhead 126 relative to the platform 102. For example, the printhead 126 can be mounted to the support 124, and the support 124 can be movable to reposition the printhead 126.

In some implementations, an actuator system 128 includes one or more actuators engaged to the systems mounted to the printhead 126. For movement along the X-axis, in some cases, the actuator 128 is configured to drive the printhead 126 and the support 124 in their entireties relative to the platform 102 along the X-axis. For example, the actuator can include rotatable gear than engages a geared surface on a horizontal support rail 140. Alternatively or additionally, the apparatus 100 includes a conveyor on which the platform 102 is located. The conveyor is driven to move the platform 102 along the X-axis relative to the printhead 126.

The actuator 128 and/or the conveyor causes relative motion between the platform 102 and the support 124 such that the support 124 advances in a forward direction 133 relative to the platform 102. The dispenser 104 can be positioned along the support 124 ahead of the energy delivery system 106 so that feed material 110 can be first dispensed, and the recently dispensed feed material can then be cured by energy delivered by the energy delivery system 106 as the support 124 is advanced relative to the platform 102.

In some implementations, the printhead(s) 126 and the constituent systems do not span the operating width of the platform 102. In this case, the actuator system 128 can be operable to drive the system across the support 124 such that the printhead 126 and each of the systems mounted to the printhead 126 are movable along the Y-axis. In some implementations (shown in FIG. 1B), the printhead(s) 126 and the constituent systems span the operating width of the platform 102, and motion along the Y-axis is not necessary.

In some cases, the platform 102 is one of multiple platforms 102a, 102b, 102c. Relative motion of the support 124 and the platforms 102a-102c enables the systems of the printhead 126 to be repositioned above any of the platforms 102a-102c, thereby allowing feed material to be dispensed and fused on each of the platforms, 102a, 102b, and 102c, to form multiple objects. The platforms 102a-102c can be arranged along the direction of motion 133, e.g., along the X-axis.

In some implementations, the additive manufacturing apparatus 100 includes a bulk energy delivery system 134. For example, in contrast to delivery of energy by the energy delivery system 106 along a path on the uppermost layer 116 of feed material, the bulk energy delivery system 134 delivers energy to a predefined area of the uppermost layer 116. The bulk energy delivery system 134 can include one or more heating lamps, e.g., an array of heating lamps, that when activated deliver the energy to the predefined area within the uppermost layer 116 of feed material 110.

The bulk energy delivery system 134 is arranged ahead of or behind the energy delivery system 106, e.g., relative to the forward direction 133. The bulk energy delivery system 134 can be arranged ahead of the energy delivery system 106, for example, to deliver energy immediately after the feed material 110 is dispensed by the dispenser 104. This initial delivery of energy by the bulk energy delivery system 134 can stabilize the feed material 110 prior to delivery of energy by the energy delivery system 106 to fuse the feed material 110 to form the object. The energy delivered by the bulk energy delivery system can be sufficient to raise the temperature of the feed material above an initial temperature when dispensed, to an elevated temperature that is still lower than the temperature at which the feed material melts or fuses. The elevated temperature can be below a temperature at which the powder becomes tacky, above a temperature at which the powder becomes tacky but below a temperature at which the powder becomes caked, or above a temperature at which the powder becomes caked.

Alternatively, the bulk energy delivery system 134 can be arranged behind the energy delivery system 106, for example, to deliver energy immediately after the energy delivery system 106 delivers energy to the feed material 110. This subsequent delivery of energy by the bulk energy delivery system 134 can control the cool-down temperature profile of the feed material, thus providing improved uniformity of curing. In some cases, the bulk energy delivery system 134 is a first of multiple bulk energy delivery systems 134a, 134b, with the bulk energy delivery system 134a being arranged behind the energy delivery system 106 and the bulk energy delivery system 134b being arranged ahead of the energy delivery system 106.

Optionally, the apparatus 100 includes a first sensing system 136a and/or a second sensing system 136b to detect properties, e.g., temperature, density, and material, of the layer 116, as well as powder dispensed by the dispenser 104. The controller 108 can coordinate the operations of the energy delivery system 106, the dispenser 104, and, if present, any other systems of the apparatus 100. In some cases, the controller 108 can receive user input signal on a user interface of the apparatus or sensing signals from the sensing systems 136a, 136b of the apparatus 100, and control the energy delivery system 106 and the dispenser 104 based on these signals.

Optionally, the apparatus 100 can also include a spreader 138, e.g., a roller or blade, that cooperates with first the dispenser 104 to compact and/or spread feed material 110 dispensed by the dispenser 104. The spreader 138 can provide the layer with a substantially uniform thickness. In some cases, the spreader 138 can press on the layer of feed material 110 to compact the feed material 110. The spreader 138 can be supported by the support 124, e.g., on the printhead 126, or can be supported separately from the printhead 126.

In some implementations, the dispenser 104 includes multiple dispensers 104a, 104b, and the feed material 110 includes multiple types of feed material 110a, 110b. A first dispenser 104a dispenses the first feed material 110a, while a second dispenser 104b dispenses the second feed material 110b. If present, the second dispenser 104b enables delivery of a second feed material 110b having properties that differ from those of the first feed material 110a. For example, the first feed material 110a and the second feed material 110b can differ in material composition or average particle size.

In some implementations, the particles of the first feed material 110a can have a larger mean diameter than the particles of the second feed material 110b, e.g., by a factor of two or more. When the second feed material 110b is dispensed on a layer of the first feed material 110a, the second feed material 110b infiltrates the layer of first feed material 110a to fill voids between particles of the first feed material 110a. The second feed material 110b, having a smaller particle size than the first feed material 110a, can achieve a higher resolution.

In some cases, the spreader 138 includes multiple spreaders 138a, 138b, with the first spreader 138a being operable with the first dispenser 104a to spread and compact the first feed material 110a second spreader 138b being operable with the second dispenser 104b to spread and compact the second feed material 110b.

FIGS. 2A-2B show an example implementation of the energy delivery system 106. In the illustrated implementation, the reflector assembly 118 includes a primary mirror scanner 204 and an auxiliary polygon mirror scanner 202 that receives the light beam 114 from the light source 120 and reflects the light beam towards the primary mirror scanner 204. The auxiliary polygon mirror scanner 202 can cause the light beam 114 to dither along a scan path across the exposed layer of feed material 110. The primary mirror scanner 204 receives the light beam 114 reflected by the auxiliary polygon mirror scanner 202 and directs the light beam to impinge on an exposed layer of feed material 110.

While the illustrated implementation shows the primary mirror scanner 204 as a polygon mirror scanner, another type of mirror scanner can be used, such as a galvo mirror scanner. As a polygon mirror scanner, the primary mirror scanner 204 can include a plurality of substantially flat facets 214.

In the illustrated implementation, the primary mirror scanner 204 is a polygon mirror scanner. In such an implementation, the auxiliary polygon mirror scanner 202 can rotate faster than the primary polygon mirror scanner 204. For example, the auxiliary polygon mirror scanner 202 can rotate three to ten times faster than the primary polygon mirror scanner 204.

The primary polygon mirror scanner 204 and auxiliary polygon mirror scanner 202 rotate about parallel axes of rotation. The primary polygon mirror scanner 204 and auxiliary polygon mirror scanner 202 can rotate in the same direction.

The auxiliary polygon mirror scanner 202 has an even number of sides. The sides alternate between different curvatures. In some implementations, the sides alternate sides between flat sides 206 and curved sides 208. While the illustrated implementation shows flat and convex sides, other geometries can be used. The curved sides 208 are not merely short rounded edges between the flat facets 206; the curved sides 208 can have a length about equal to that of the flat facets 206.

The primary mirror scanner 204 is capable of driving the light beam 114 along a path across a surface of the feed material 110, while the auxiliary polygon mirror scanner 202 is configured to dither the light beam 114 as it travels along a scan path across the surface. In the implementation illustrated in FIGS. 2A and 2B, the dither is parallel and in-line with the scan path across the surface of the feed material 110.

In the illustrated implementation, the curved sides 208 have a surface that is equidistance from the axis of rotation 210, e.g., it forms a circular arc segment with a center coincident with the axis of rotation. As a result, while the light beam 114 is impinging on a curved surface 208, the deflection angle of the light beam 114 from the auxiliary polygon mirror scanner 202 will not change as the auxiliary polygon mirror scanner 202 rotates. Thus, while the light beam 114 is impinging on a curved surface 208, rotation of the primary polygon mirror scanner 204 will drive the light beam in a forward scanning direction A.

However, when the light beam 114 impinges on one of the flat surfaces 206, the angle incidence of the light beam 114 on the flat surface 206, and therefore, the deflection angle of the light beam 114, changes during the rotation of the auxiliary polygon mirror scanner 202. The change in deflection angle from the auxiliary polygon mirror scanner 202 is alters the incident angle of the light beam 114 on the facet 214 of the primary mirror scanner 204, and thus changes the deflection angle off of the primary mirror scanner 204. In particular, due to the higher rotation rate of the auxiliary polygon mirror scanner 202, the light beam 114 will backtrack along the facet 214 of the primary polygon mirror scanner 204, and as a result, the light beam 114 will be driven in a reverse scanning direction B.

As shown in FIG. 2C, the cyclic changing of deflection angles can cause a scanning path of the laser to back-track over itself. That is, as the light beam crosses a scan path 214, the change in deflection angles can cause the light beam to periodically back-track in the opposite direction 216 of the scan path 214. The distance of each "back cycle" can be increased if the platform 102 also moves relative to the energy delivery system 106.

In particular, the primary mirror scanner 204 and auxiliary polygon scanner 202 can produce this back-and-forth pattern if the auxiliary polygon scanner 202 rotates at twice the angular velocity of the regular polygon of the primary mirror scanner 204. To get an exact overlap of the regions illuminated during forward and retrograde scanning, the light beam should be turned off during the non-overlap portion.

Figure 3B:
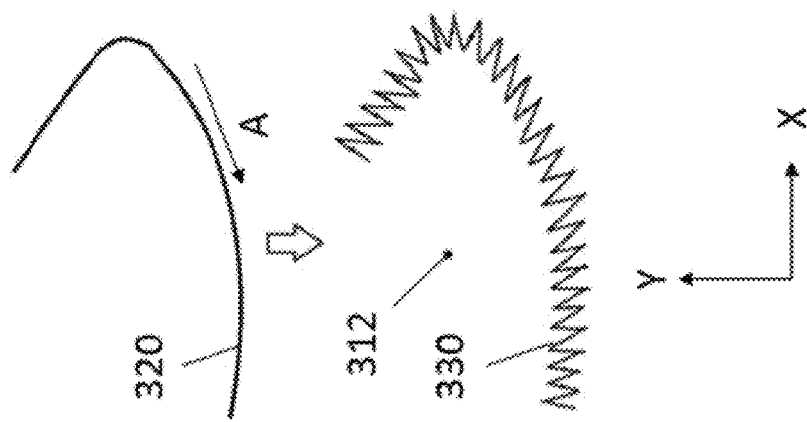
FIG. 3B illustrates a schematic example scan path.
Figure 3A:
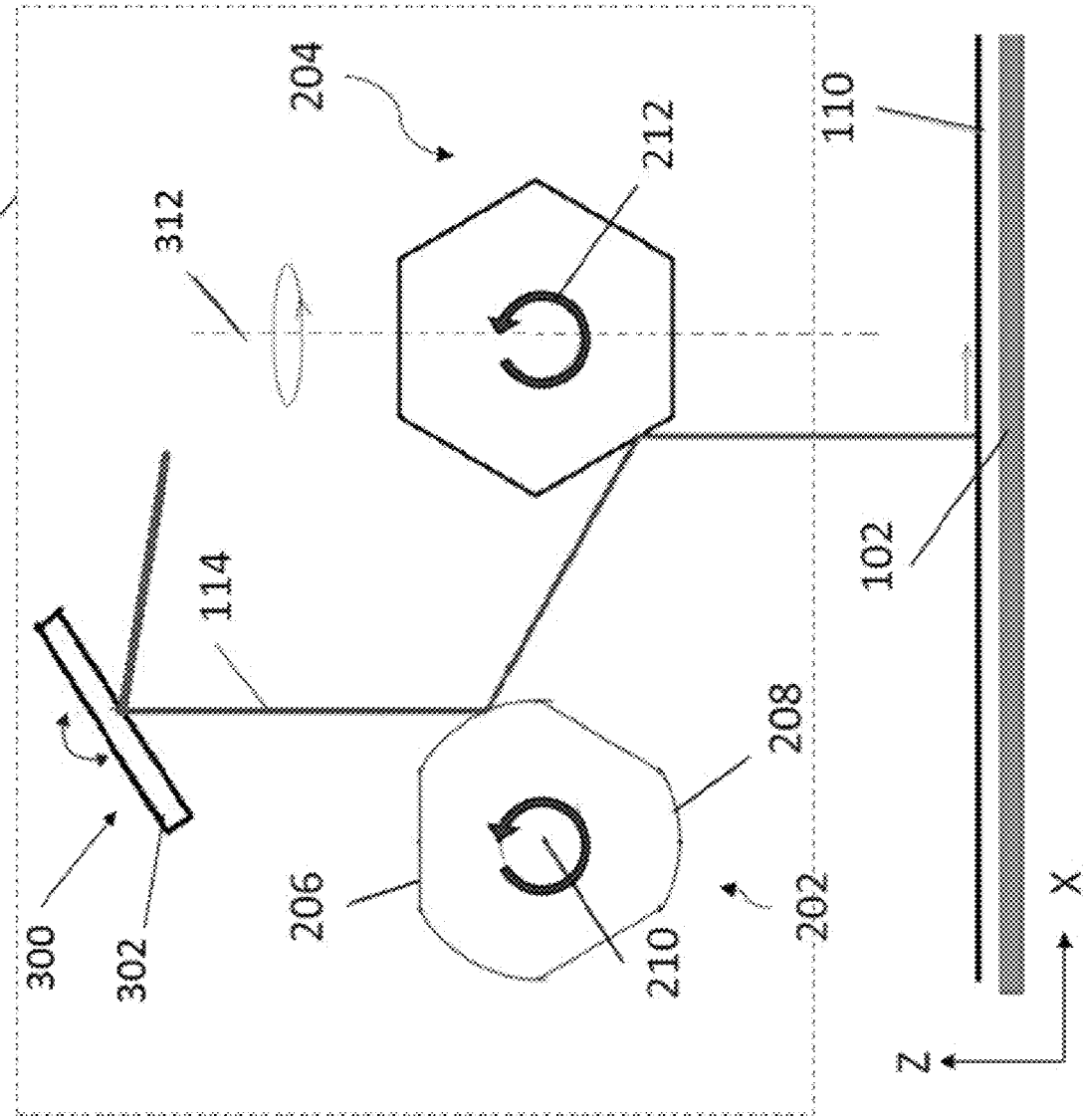
FIG. 3A is a schematic diagram of an example dithering mechanism.

FIG. 3A is a schematic illustration on another example implementation of the energy delivery system 106. This implementation, the two polygon mirror scanners 202, 204 are integrated with a 1D galvo system scanning system 300 with a single mirror 302. In addition, the entire optical assembly 310 (including the galvo mirror 302, the primary polygon mirror scanner 204 and the auxiliary polygon mirror scanner 202) can rotate about a vertical axis 312 that passes through the primary polygon mirror scanner 204.

In the absence of the polygon mirror scanners, the light beam trace a path in a controllable polar coordinate system (the galvo mirror 352 is used to change the radial position of the beam and rotation of the assembly 360 is used to change the angular position of the beam). For example, FIG. 3B illustrates the light beam tracing a path 320 in a first direction (e.g., the direction of arrow A).

However, the polygon mirror scanners 202, 204 can cooperate to superimpose a radially oscillating scanning pattern on top of the original scan path. For example, as shown in FIG. 3B, the light beam can undergo an oscillating motion toward and away from the axis of rotation 312. Assuming that the scan path 320 is purely angular (and not radial), this oscillation can be normal to the direction of motion (e.g., perpendicular to the direction of arrow A). This can result in the light following a "zig-zag" path 330.

Figure 4B:
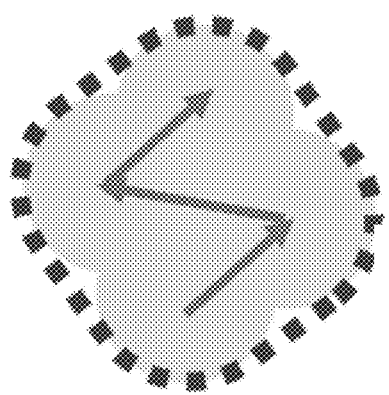
FIGS. 4A-4B are schematic diagrams of example scan paths.
Figure 4A:
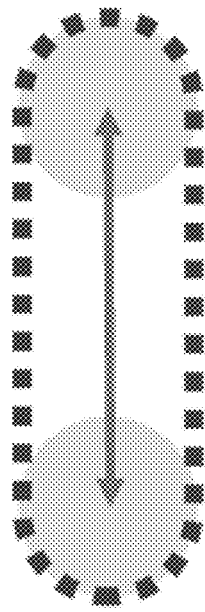

FIG. 4A shows a detailed view of an effective dot size when in-line dithering is applied. The back and forth motion along the scan path will effectively widen the scan path due to bearing wobble in the mirror scanners. The back and forth motion also reduces the apparent noise and imperfections that can be inherent when using polygon mirror scanners.

FIG. 4B shows an effective dot size when dithering perpendicular to the scan path is used. As the light beam oscillates across the scan path, the apparent dot size is enlarged.

Figure 5:
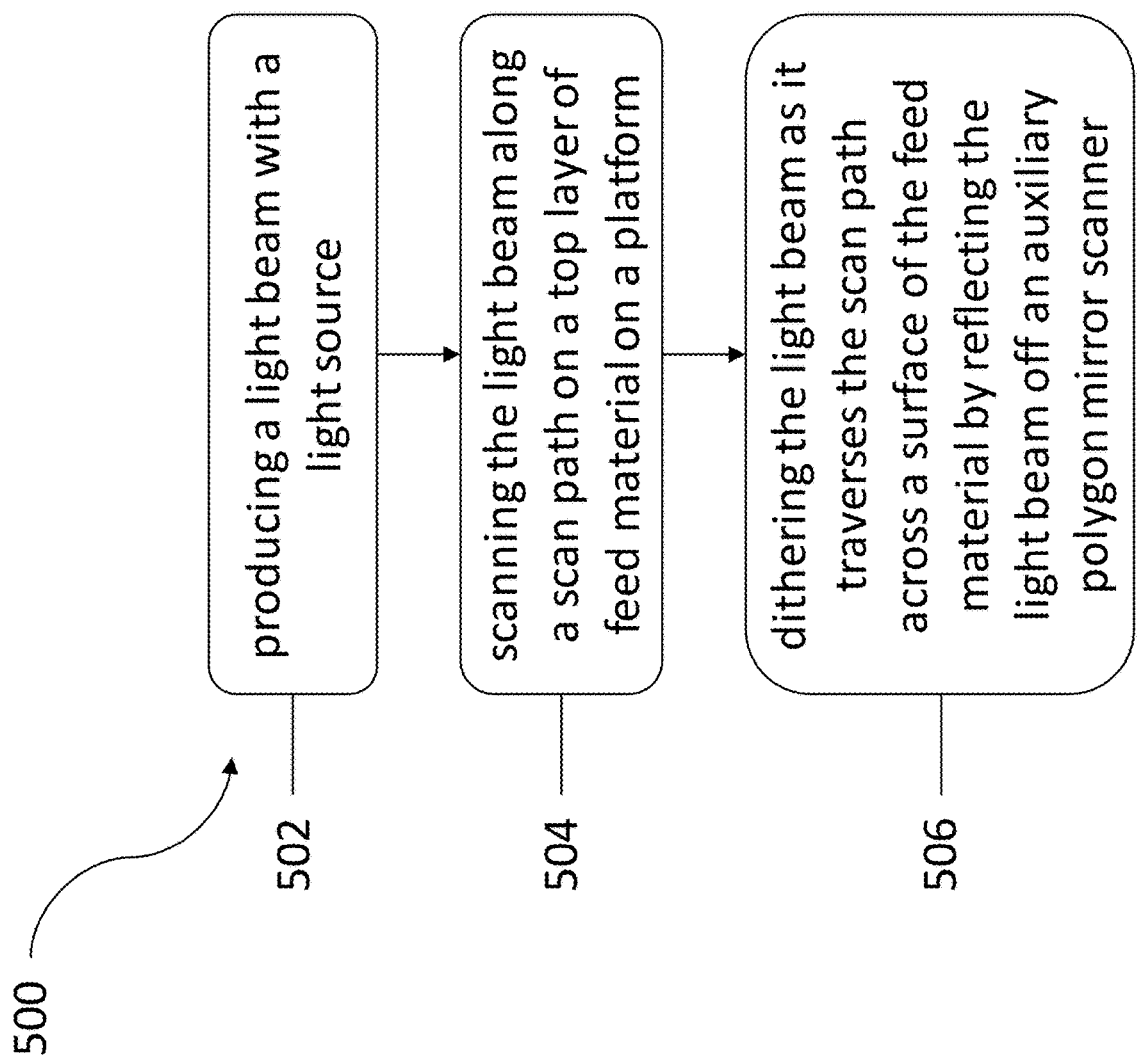
FIG. 5 is a flowchart showing an example method for additive manufacturing.

FIG. 5 shows a flowchart of a method 500 that can be used with certain aspects of this disclosure. At 502, a light beam 114 is produced with a light source 120. At 504, the light beam 114 is scanned along a scan path on a top layer of feed material 110 on a platform 102. At 506, the light beam 114 is dithered as it traverses the scan path across a surface of the feed material 110 by reflecting the light beam 114 off an auxiliary polygon mirror scanner 202. Dithering the light beam 114 along the scan path includes oscillating a termination of the light beam 114 parallel and in-line with the scan path. In some implementations, dithering the light beam 114 along the scan path can include oscillating a termination of the light beam 114 perpendicular to the scan path. In some implementations, the light beam 114 can be directed towards the primary polygon mirror scanner 204 with the auxiliary polygon mirror scanner 202. In some implementations, the light beam 114 can be directed towards a galvo mirror scanner with the auxiliary polygon mirror scanner 202. In some implementations, the light beam 114 can be directed towards the auxiliary polygon mirror scanner 202 with a separate galvo mirror scanner upstream in the light beam path.

In some implementations, the additive manufacturing system 100 includes another heat source, e.g., one or more IR lamps arranged to direct heat onto the uppermost layer of the feed material. After pre-heating the first area of the layer of the feed material using the other heat source, a second area of the layer of the feed material can be pre-heated with the polygon mirror scanner, such as the polygon mirror scanner 208a, reflecting the first light beam onto the second area of the layer of the feed material. The second area can be different from the first area of the layer of the feed material. After fusing the first area of the layer of the feed material, the second area of the layer of the feed material can be fused with a mirror scanner, such as the primary mirror scanner 204, reflecting the second light beam onto the second area of the layer of the feed material after the first area has been pre-heated. The second area can be different from the first area of the layer of the feed material.

Controllers and computing devices can implement these operations and other processes and operations described herein. As described above, the controller 108 can include one or more processing devices connected to the various components of the apparatus 100. The controller 108 can coordinate the operation and cause the apparatus 100 to carry out the various functional operations or sequence of steps described above.

The controller 108 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 108 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. In addition, the data object could be other formats such as multiple files or a file with multiple layer in tiff, jpeg, or bitmap format. For example, the controller could receive the data object from a remote computer. A processor in the controller 108, e.g., as controlled by firmware or software, can interpret the data object received from the computer to generate the set of signals necessary to control the components of the system 100 to fuse the specified pattern for each layer.

The processing conditions for additive manufacturing of metals and ceramics are significantly different than those for plastics. For example, in general, metals and ceramics require significantly higher processing temperatures. Thus, 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems can generally be integrated together in a single product or packaged into multiple products.

Thus, particular implementations of the subject matter have been described. Other implementations are within the scope of the following claims.

Optionally, some parts of the additive manufacturing system 100, e.g., the build platform 102 and feed material delivery system, can be enclosed by a housing. The housing can, for example, allow a vacuum environment to be maintained in a chamber inside the housing, e.g., pressures at about 1 Torr or below. Alternatively, the interior of the chamber can be a substantially pure gas, e.g., a gas that has been filtered to remove particulates, or the chamber can be vented to atmosphere. Pure gas can constitute inert gases such as argon, nitrogen, xenon, and mixed inert gases.

In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An additive manufacturing apparatus comprising:
a platform;
a dispenser configured to deliver a plurality of successive layers of feed material on a platform;
a light source configured to generate a light beam;
an actuator or reflector;
a primary mirror scanner to direct the light beam to impinge a spot on a surface of an exposed layer of feed material, wherein the primary mirror scanner in conjunction with the actuator or reflector is configured to cause the spot of impingement to follow a scan path across the surface controllable in two perpendicular axes; and
an auxiliary polygon mirror scanner having a primary axis of rotation and a position in a light path of the light beam between the light source and the primary mirror scanner with the position and primary axis such that rotation of the auxiliary polygon mirror scanner dithers the light beam as the spot of impingement follows the scan path, wherein the dithering oscillates a position of the spot to which the light beam is directed as the spot follows the scan path.

2. The additive manufacturing apparatus of claim 1, wherein the primary mirror scanner comprises a primary polygon mirror scanner.

3. The additive manufacturing apparatus of claim 2, comprising a controller configured to cause the auxiliary polygon mirror scanner to rotate faster than the primary polygon mirror scanner during application of the light beam to a layer of feed material.

4. The additive manufacturing apparatus of claim 2, wherein the primary polygon mirror scanner and auxiliary polygon mirror scanner rotate about parallel axes of rotation.

5. The additive manufacturing apparatus of claim 2, wherein the primary polygon mirror scanner and the auxiliary polygon mirror scanner rotate in the same direction.

6. The additive manufacturing apparatus of claim 1, wherein the primary mirror scanner and auxiliary mirror scanner are configured to dither the light beam in a direction parallel and in-line with the scan path across the surface.

7. The additive manufacturing apparatus of claim 1, comprising a galvo mirror scanner configured to receive the light beam.

8. The additive manufacturing apparatus of claim 7, wherein an optical assembly including the primary mirror scanner, the auxiliary polygon mirror scanner and the galvo mirror scanner is configured to rotate relative to the platform, and a combination of rotation relative to the platform and motion of the galvo mirror scanner drive the light beam along a scan path across a surface of the feed material.

9. The additive manufacturing apparatus of claim 7, wherein the dither is perpendicular to the scan path across the surface.

10. An additive manufacturing apparatus comprising:
a platform;
a dispenser configured to deliver a plurality of successive layers of feed material on a platform;
a light source configured to generate a light beam;
an actuator or reflector;
a primary mirror scanner to direct the light beam to impinge a spot on a surface of an exposed layer of feed material, wherein the primary mirror scanner in conjunction with the actuator or reflector is configured to cause the spot of impingement to follow a scan path across the surface controllable in two perpendicular axes; and an auxiliary polygon mirror scanner having a primary axis of rotation and a position in a light path of the light beam between the light source and the primary mirror scanner with the position and primary axis such that rotation of the auxiliary polygon mirror scanner dithers the light beam as the spot of impingement follows the scan path, wherein the dithering oscillates a position of the spot to which the light beam is directed as the spot follows the scan path, wherein the auxiliary polygon mirror scanner comprises an even number of sides, and wherein alternating sides have different curvatures.

11. The additive manufacturing apparatus of claim 10, wherein the alternating sides comprise flat sides and curved sides.

12. The additive manufacturing apparatus of claim 11, wherein the curved sides are convex.

13. An additive manufacturing system comprising:
a platform;
a dispenser configured to deliver a plurality of successive layers of feed material on a platform;
a light source configured to generate a light beam;
a primary polygon mirror scanner;
an auxiliary polygon mirror scanner; and
a controller configured to
   cause the primary polygon mirror scanner to direct the light beam to impinge on an exposed layer of feed material at a spot of impingement and move along a scan path, and
   cause the auxiliary polygon mirror scanner to direct the light beam from the light source towards the primary polygon mirror scanner so as to dither the light beam in a direction parallel and in-line with the scan path of the spot of impingement across the exposed layer of feed material, wherein the dithering oscillates a position of the spot to which the light beam is directed as spot follows the scan path.

14. The additive manufacturing system of claim 13, wherein the primary mirror scanner comprises a primary polygon mirror scanner.

15. The additive manufacturing system of claim 14, wherein the primary polygon mirror scanner and auxiliary polygon mirror scanner rotate about parallel axes of rotation.

16. The additive manufacturing system of claim 14, wherein the primary polygon mirror scanner and the auxiliary polygon mirror scanner rotate in the same direction.

17. The additive manufacturing system of claim 13, further comprising a galvo mirror scanner configured to receive the light beam.

18. The additive manufacturing system of claim 17, wherein an optical assembly including the primary mirror scanner, the auxiliary polygon mirror scanner and the galvo mirror scanner is configured to rotate relative to the platform, and a combination of rotation relative to the platform and motion of the galvo mirror scanner drive the light beam along a scan path across a surface of the feed material.

* * * * *